(12) United States Patent
Tate

(10) Patent No.: US 7,293,123 B2
(45) Date of Patent: Nov. 6, 2007

(54) ASYMMETRIC DATA PATH MEDIA ACCESS CONTROLLER

(76) Inventor: Michael Tate, 7912 E. Woodland Park Dr., Spokane, WA (US) 99212

(*) Notice: Subject to any disclaimer, the term of this patent is extended or adjusted under 35 U.S.C. 154(b) by 0 days.

(21) Appl. No.: 11/015,355

(22) Filed: Dec. 17, 2004

(65) Prior Publication Data

US 2005/0116741 A1 Jun. 2, 2005

Related U.S. Application Data

(62) Division of application No. 09/921,741, filed on Aug. 1, 2001, now Pat. No. 6,892,252.

(60) Provisional application No. 60/234,396, filed on Sep. 21, 2000.

(51) Int. Cl.
*G06F 3/00* (2006.01)
*G06F 15/16* (2006.01)

(52) U.S. Cl. .................... 710/66; 710/30; 710/36; 709/250

(58) Field of Classification Search ............... 710/62, 710/65, 66, 30, 36; 709/250
See application file for complete search history.

(56) References Cited

U.S. PATENT DOCUMENTS

| | | | |
|---|---|---|---|
| 4,984,195 A | 1/1991 | Nakamura et al. | |
| 5,142,556 A | 8/1992 | Ito | |
| 5,159,679 A | 10/1992 | Culley | |
| 5,341,488 A | 8/1994 | Kobayashi | |
| 5,754,875 A | 5/1998 | Getzlaff et al. | |
| 5,812,792 A | 9/1998 | Haddock et al. | |
| 5,950,223 A | 9/1999 | Chiang et al. | |
| 6,356,506 B1 * | 3/2002 | Ryan | 365/233 |
| 6,460,105 B1 * | 10/2002 | Jones et al. | 710/268 |
| 6,522,188 B1 * | 2/2003 | Poole | 327/407 |
| 6,714,553 B1 * | 3/2004 | Poole et al. | 370/412 |
| 6,788,704 B1 * | 9/2004 | Lindsay | 370/465 |
| 6,880,086 B2 * | 4/2005 | Kidder et al. | 713/191 |
| 2002/0001307 A1 * | 1/2002 | Nguyen et al. | 370/386 |
| 2002/0116485 A1 * | 8/2002 | Black et al. | 709/223 |
| 2002/0165961 A1 * | 11/2002 | Everdell et al. | 709/225 |

OTHER PUBLICATIONS

Katz, Randy; Contemporary Logic Design; 1994; Benjamin/Cummings Publishing Company; pp. 330-334.*

(Continued)

*Primary Examiner*—Alan S. Chen
(74) *Attorney, Agent, or Firm*—Klarquist Sparkman LLP

(57) ABSTRACT

A method and apparatus for maintaining data throughput in a data element includes receiving a clock and a first plurality of instances of data having a first width on an input, sampling consecutive ones of instances of the data having the first width at consecutive ones of a first rising edge and a first falling edge of the clock, respectively, to generate two plurality of instances of sampled data having a first width. The plurality of instances of sampled data is then sampled at a second rising edge of the clock and parallelized to generate a second plurality of instances of parallel data having a second width greater than the first width. The parallel data may then be processed to for example generate statistics to monitor link integrity, prior to being transmitted. A 10 Gbps data transmission speed may be maintained using the IEEE 802.3ae-specified media independent interface clock.

7 Claims, 7 Drawing Sheets

OTHER PUBLICATIONS

IEEE 100, The Authoritative Dictionary of IEEE Standards Terms, Seventh Edition=>Definition of term "gate".*
IEEEE 802.3 High Speed Study Group, 7 pages.
Howard Frazier, IEEE P802.3ae 10 Gigabit Ethernet Task Force XGMII Update, Jul. 11, 2000, 12 pages.
Howard Frazier, IEEE 802.3 Higher Speed Study Group 10 Gig MII Update, Sep. 28, 1999, 24 pages.
Howard Frazier, et al., IEEE 802.3 Higher Speed Study Group, Proposal for a 10 Gbps MII< Jul. 10, 1999, 12 pages.
Howard Frazier, IEEE 802.3 Higher Speed Study Group 10 Gig MII Update, Nov. 9, 1999, 24 pages.
PCI Local Bus Specification, Production Version, Revision 2.1, Jun. 1, 1995.
www.webopedia.com, The 7 layers of the OSI model.

* cited by examiner

ASYMMETRIC DATA PATH MEDIA ACCESS CONTROLLER

CROSS-REFERENCE TO RELATED APPLICATION

This application is a divisional of U.S. patent application Ser. No. 09/921,741, inventor Michael Tate, entitled ASYMMETRIC DATA PATH MEDIA ACCESS CONTROLLER, filed on Aug. 1, 2001, Now U.S. Pat. No. 6,892,252 which claims the benefit of U.S. Provisional Patent application Serial. No. 60/234,396, inventor Michael Tate, entitled ASYMMETRIC DATA PATH MEDIA ACCESS CONTROLLER, filed on Sep. 21, 2000, the contents of both of which are incorporated herein by reference.

FIELD OF THE INVENTION

The present invention relates to a method and apparatus for maintaining throughput in a data element, and more particularly, to a method and apparatus for maintaining throughput in a data element by using a sampling scheme to increase the number of bits at an output as compared with an input.

BACKGROUND

The Institute of Electrical and Electronics Engineers (IEEE) Standard 802.3ae, entitled "Ten Gigabit Per Second Ethernet Task Force" defines a gigabit per second industry standard for interconnecting high-performance switches, routers, servers, and the like in the backbone of local area networks (LANs), Metropolitan Area Networks (MANs), native attachments to a Wide Area Network (WAN), and the like. Two features specified by the 802.3ae standard are a 32-bit data path and a clock. In operation, the 32-bit data and clock are received by a physical layer device and forwarded through a Media Independent Interface (MII) to a Media Access Controller (MAC).

The MAC resides on the data path between the Physical Layer Controller (PHY) and a Packet Switching Controller (PSC). In accordance with industry standards a MAC is required to support certain standardized features and functions. However, MAC designers often have flexibility, to determine how to support the standardized functions and features.

Data transmission speed across the data path is generally a product of the data path width and the data sampling speed. In addition, the clock frequency of a data transmission system is inversely proportional to the data path width if the same total aggregate throughput is to be maintained in a pipelined system. It is known to implement Ethernet MAC layer logic as a pair of same bit width receive and transmit data paths to which operations are performed. As such, it then follows that the same size receive and transmit data paths in a MAC application will require the same clock frequencies for each path.

For the transmit data path, the desired clock frequency is easily generated by an external commercial oscillator. For the receive data path, however, the receive clock is derived from the IEEE specified MII receive data clock. The specified MII-supplied clock frequency, however, is inadequate to maintain certain data rates such as, for example, a 10 Gbps data transmission rate, using rising edge only sampling of 32-bit wide data. In fact, the MII-supplied receive clock specified by the IEEE standard is approximately half the frequency required to generate the 32 bit data path as desirable at a 10 Gbps data rate on the transmit side.

The deficiencies of present methods for maintaining data throughput at high data rates show that a need exists for maintaining high data throughput in a data element compatible with standardized features specified by IEEE 802.3ae.

SUMMARY OF THE INVENTION

An exemplary embodiment of the present invention provides an asymmetric data path for achieving a high data throughput such as, for example 10 Gbps or greater. In accordance with an exemplary embodiment the desired clock frequency for a transmit data path, may be generated by an external commercial oscillator. However, the receive clock is derived from a standardized clock having a frequency that would otherwise be too slow using conventional methods to support the data throughput rate. Therefore, an exemplary embodiment of the present invention includes an asymmetric data path wherein the width of the receive data path is greater than that of the transmit data path to accommodate the different clock rates for the receive and transmit data paths.

Accordingly, an exemplary method for maintaining throughput in a data path includes the steps of receiving a clock and a plurality of instances of data having a first width on an input, processing consecutive ones of the plurality of instances of data having the first width to produce more than one of a plurality of instances of data having a second width wherein the second data width are equivalent to the first data width and the more than one of the plurality of instances of data having the second data width are used to produce a plurality of instances of data having a third data width wherein the third data width are greater than the second data width and the plurality of instances of data having the third data width are used to produce a plurality of instances of data having an output data width wherein the output data width are equivalent to the third data width, and transmitting the plurality of instances of data having the output data width.

The invention provides a method for maintaining throughput in a data element, such as, for example, a 10 Gigabit Ethernet MAC receive function element, without introducing unnecessary risk and complexity associated with using multiplied clock sampling or rising and falling edge sampling throughout the receive function element. In another embodiment of the present invention, the method includes the steps of receiving at a first element a clock and a first plurality of instances of data having a first bit-width as an input, transmitting the clock and first plurality of instances of data having the first width to a second element, operating on the first plurality of instances of data having the first width to produce a second plurality of instances of data having a second width, transmitting the clock and second plurality of instances of data having the second width to a third element, operating on the second plurality of instances of data having the second width to produce a third plurality of instances of data having a third width, transmitting the third plurality of instances of data having the third width to a fourth element, and operating on the third plurality of instances of data having the third width to produce a fourth plurality of instances of data having a fourth width.

In another embodiment of the present invention, the method includes the steps of receiving a first data having first bit-width bits, management bits and clock bits, inputting the first bit-width bits and clock bits into a receive data path, and processing the first bit-width bits to generate processed data having a second bit-width which is greater than said first bit-width.

In another embodiment of the present invention, the switch includes one or more ports for receiving a plurality of inbound packets and for transmitting a plurality of outbound packets, a physical layer device coupled to the input ports for receiving the plurality of inbound packets, a media independent interface coupled to the physical layer device for receiving the plurality of inbound packets from the physical layer device, a media access controller coupled to the media independent interface for receiving the output of the media independent interface and for processing the output of the media independent interface to increase bit width, and a packet switching controller coupled to the media access controller for receiving the increased bit width data and for transmitting the increased bit width data.

In another embodiment of the present invention, the media access controller includes a first gate for sampling an input data stream having a first bit width in accordance with a first rising edge of a clock, a second gate for sampling said input data stream in accordance with a first falling edge of a clock, and a third gate coupled to said first and second gates for combining outputs of said first and second gates in accordance with a second rising edge of said clock to produce an output data stream having a second bit width greater than said first bit width.

In yet another embodiment of the present invention, the media access controller includes a first data path having a first bit-width, and a second data path including a receive function element that receives input data at said first bit width and processes said input data to generate output data having a second bit width greater than said first bit width.

BRIEF DESCRIPTION OF THE DRAWING

These and other features, aspects, and advantages of the present invention will become better understood with regard to the following description, appended claims, and accompanying drawings where:

DETAILED DESCRIPTION OF THE INVENTION

An exemplary embodiment of the present invention provides an asymmetric data path for achieving a high data throughput such as, for example 10 Gbps, using a standardized clock having a frequency that would otherwise be too slow using conventional methods to support the data throughput rate. In order to appreciate the advantages of the present invention, it will be beneficial to describe the invention in the context of an exemplary network system, such as for example a high speed Ethernet switch. One of skill in the art will appreciate that the present invention is not limited to the described exemplary embodiment. Rather, the present invention may be utilized to provide a higher throughput data rate in any symmetric or asymmetric data path.

Figure 1:
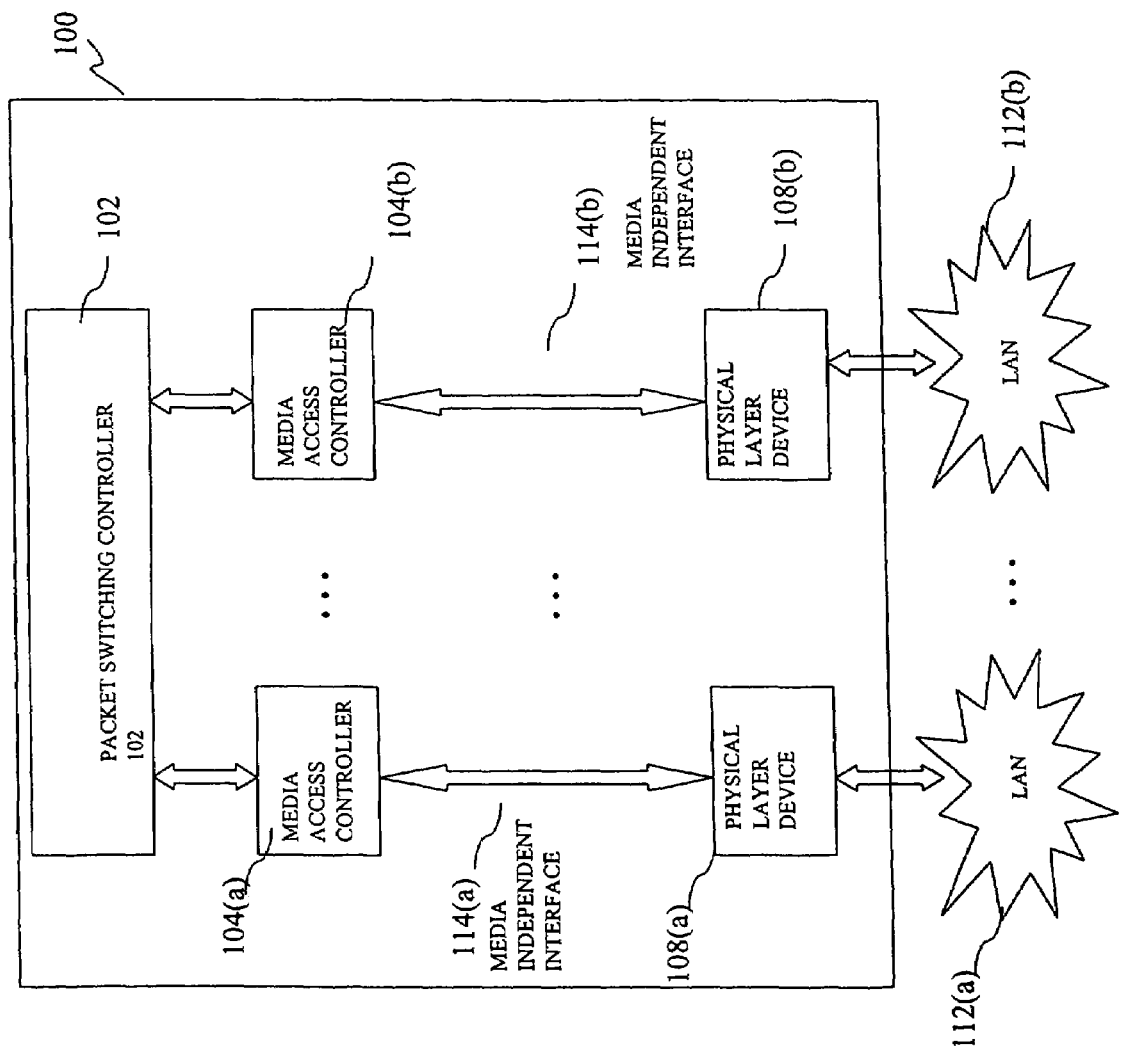
FIG. 1 is a simplified block diagram of a system having a media access controller for providing bi-directional communication between a packet switch and one or more local area networks.

FIG. 1 is a simplified block diagram illustrating an exemplary operating environment of the present invention. In accordance with an exemplary embodiment, a switch 100, comprising one or more media independent interfaces (MII) 114(a) and 114(b), one or more PHYs 108(a) and 108(b) and one or more MACs 104(a) and 104(b) provides bi-directional communication between a packet switching controller (PSC) 102 and devices, such as, for example a personal computer (PC) or Ethernet phone operating on LANs 112(a) and 112(b).

The media independent interfaces 114(a) and 114(b) provide a bidirectional interface between the PHYs 108(a) and 108(b) and the MACs 104(a) and 104(b) respectively. The PHYs 108(a) and 108(b) preferably receive inbound packets and transmit outbound packets to the LANs 112(a) and 112(b) respectively. The PHYs preferably perform flow independent physical layer operations on the inbound packets. In accordance with an exemplary embodiment, the PHYs may perform all the physical layer interface (PHY) functions for full duplex or half-duplex Ethernet.

For example, in the described exemplary embodiment the PHYs may decode received data packets and encode output data packets in accordance with a variety of standards such as for example 4B5b, MLT3, and Manchester decoding. The PHYs 108(a) and 108(b) may also perform clock and data recovery, stream cipher de-scrambling, and digital adaptive equalization.

In the described exemplary embodiment, MACs 104(a) and 104(b) perform flow independent MAC layer operations on the inbound packets. For example, MACs 104(a) and 104(b) may process the received Ethernet packets and forward higher layer packets to the PSC 102. The PSC 102 preferably receives the inbound packets, classifies the packets, generates application data for the inbound packets, modifies the inbound packets in accordance with the application data, and transmits the modified inbound packets onto, for example, a switching backplane.

In an exemplary embodiment the packet switching controller 102 may also receive outbound packets from other packet switching controllers over the backplane. The PSC 102 may then transmit the outbound packets to the MACs 104(a) and 104(b) for forwarding to local devices via the MIIs 114(a) and 114(b), PHYs 108(a) and 108(b) and LANs 112(a) and 112(b), respectively. In an exemplary embodiment of the present invention, the MACs 104(a) and 104(b) encode packets in the transmit path into Ethernet packets for communication to external device operating on the local area network. The MACs 104(a) and 104(b) may also perform additional management functions such as, for example, link integrity monitoring.

In other embodiments, the packet switching controller 102 may subject one or more outbound packets to egress processing prior to forwarding them to the MACs 104(*a*) and 104(*b*). Further, the packet switching controller 102 may be implemented in non-programmable logic, programmable logic or any combination of programmable and non-programmable logic.

Figure 2:
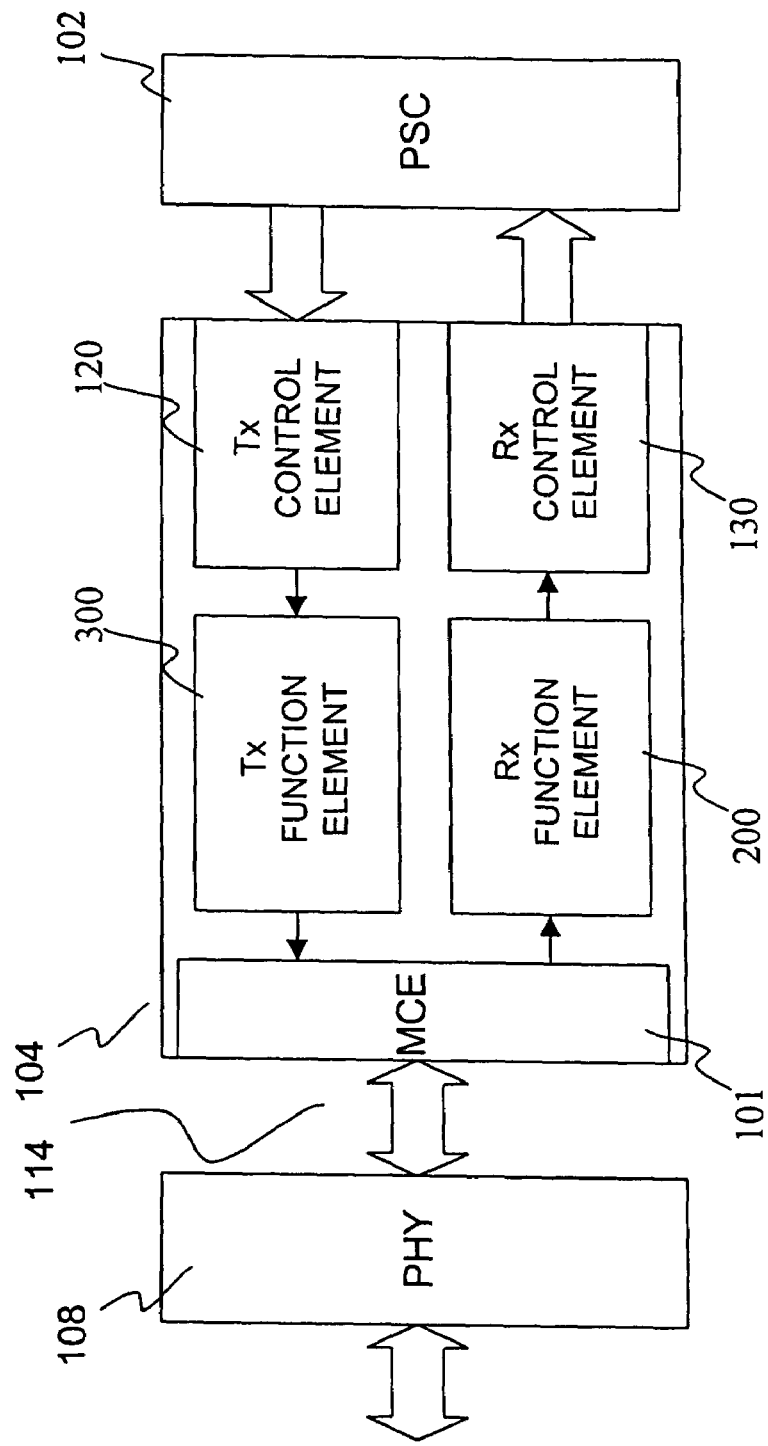
FIG. 2 is a simplified block diagram of the media access controller of FIG. 1 in accordance with an exemplary embodiment of the present invention.

Referring to FIG. 2, an exemplary MAC 104, in accordance with the present invention, comprises a transmit function element 300, and transmit control element 120 coupled between a management control element (MCE) 101 and PSC 102 in the transmit path. In the described exemplary embodiment the transmit control element 120 receives outbound packets from the PSC 102. An exemplary transmit control element may, upon request by the system, conditionally transmit special packets (flow control packets) that disable and enable packet transmission from the MAC on the other side of the link. In addition, preferably under control of the receive control element, the transmit control element may also prohibit flow of frames from the system to the transmit function element 300.

In an exemplary embodiment of the present invention, the transmit function element 300 may process outbound packets in accordance with one or more operative communication protocols, such as, for example, media access control (MAC) bridging and Internet Protocol (IP) routing. The transmit function element 300 may encapsulate outbound data with the appropriate MAC address of the external device on the LAN before sending over the MII 114.

Further, an exemplary MAC may also comprise a receive function element 200 and a receive control element 130 coupled between the MCE 101 and the PSC 102. An exemplary receive function element 200 receives inbound packets from the MCE 101 and preferably removes the data from the frames and checks for transmission errors in the received frames. In an exemplary embodiment the receive control element recognizes special packets (e.g. flow control packets) that disable and enable packet transmission from the MAC to the PSC 102.

Figure 3:
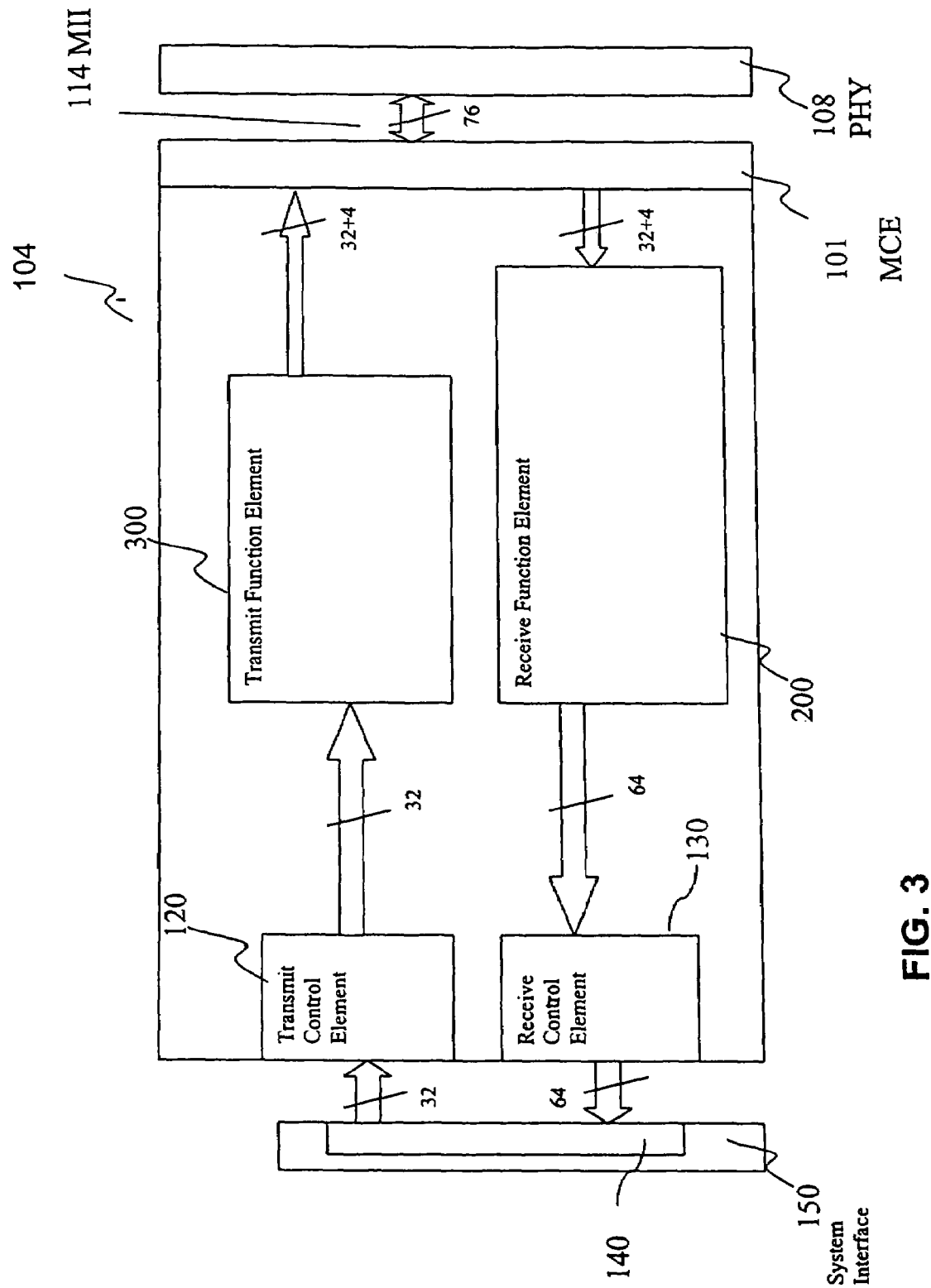
FIG. 3 is a block diagram illustrating greater details of the system for providing bi-directional communication between a packet switch and one or more local area networks illustrated in FIG. 1 in accordance with an exemplary embodiment of the present invention.

FIG. 3 is a simplified block diagram illustrating the exemplary data path of FIG. 2 in greater detail. An exemplary system may comprise a system interface 150, and PHY 108. An exemplary MAC 104 may include the transmit control element 120, the receive control element 130, the transmit function element 300, the receive function element 200, and a management control element (MCE) 101.

In operation, the PHY 108 communicates incoming data packets to the MCE 101 through a 76 bit data path within the MII 114. In one embodiment an incoming data packet preferably comprises 32 bits of data, 4 bits of control information, and 2 bits of management information. MCE 101 communicates configuration information to, and retrieves status information from ISO Layers below the MAC layer via the management information bits. In the described exemplary embodiment the MCE 101 removes the management information, and forwards the remaining 32 data bits and the 4 bits of control data to the receive function element 200.

In an exemplary embodiment, the receive function element 200 may provide receive functionality in accordance with a variety of communications protocols, such as, for example, IEEE 802.3ae receive functionality as related to the MAC layer. Similarly, the receive control element may provide flow control functionality in accordance with a variety of communications protocols, such as, for example, IEEE 802.3x functionality. In an exemplary embodiment, system interface 150 may include a transmit data path width of 32 bits and a receive data path width of 64 bits. In the described exemplary embodiment, the system interface preferably includes a FIFO 140 that receives data from the receive data path and forwards data to the transmit data path.

Figure 4:
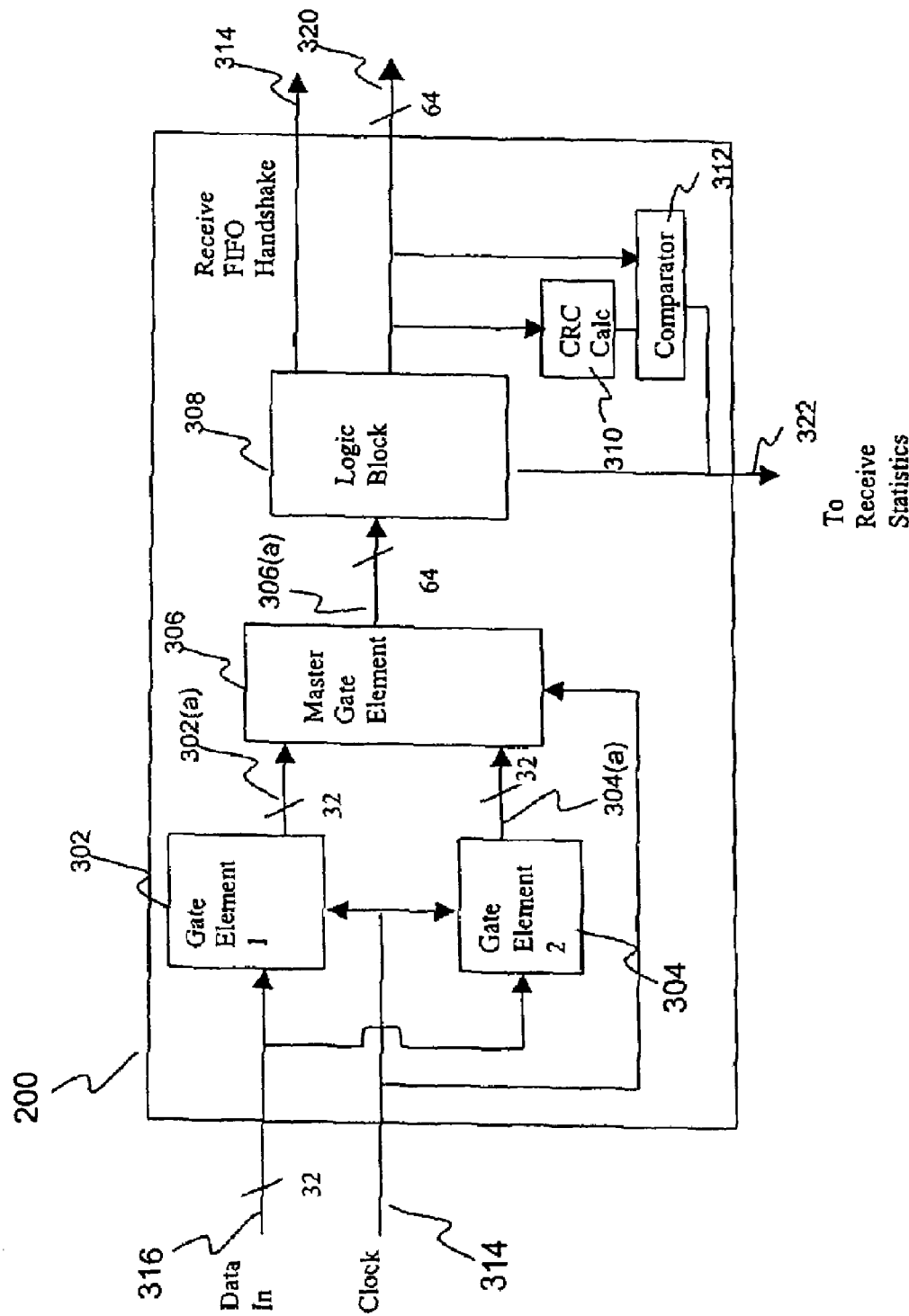
FIG. 4 is a simplified block diagram of the receive function element of the system of FIG. 3, in accordance with an exemplary embodiment of the present invention.

FIG. 4 is a simplified block diagram showing additional details of the receive function element 200 illustrated in FIG. 3. In an exemplary embodiment of the present invention, receive function element 200 preferably receives 32 bit-wide input data 316 and a standardized clock signal 314. In an exemplary embodiment of the present invention, the data 316 and clock signal 314 are received from MCE 101 via the media independent interface 114 (see FIG. 3).

In accordance with an exemplary embodiment, the receive function element preferably utilizes dual data rate (DDR) sampling to convert two 32 bit-wide serial data streams to a single 64 bit-wide parallel data stream which is output 320 to the receive control element 130 (shown in FIG. 3). In this manner, the receive data path at system interface 150 is 64 bits wide while the transmit data path is 32 bits wide.

In one embodiment, the receive function element 200 couples the 32 bit-wide input data 316 to two gate elements 302 and 304. In the described exemplary embodiment, one gate element preferably samples the input data 316 on the rising edge of the clock signal and the other gate element samples the input data 316 on the negative or falling edge of the clock signal. (This will be illustrated in the timing diagrams of FIGS. 5 and 6.) Consequently, each of the gate elements 302 and 304 preferably forward 32 bit-wide serial data streams to master gate 306.

The master gate 306 preferably performs a reverse multiplexing process to convert the multiple input streams of 32 bit-wide serial data 302(*a*) and 304(*a*) to 64 bit-wide parallel data in accordance with the rising edge of the clock. In the described exemplary embodiment, rising edge sampling is used for internally processing and outputting 64 bit-wide data.

In operation the de-multiplexed, parallel data 306(*a*) may be input to logic block 308 which inspects inter-packet gaps (IPGs) of the parallel data stream and performs preamble insertions and data alignment. In addition, in an exemplary embodiment the logic block 308 preferably analyzes the parallel data 306(*a*) and performs statistics generation.

In an exemplary embodiment of the present invention logic block 308 forwards a receive FIFO handshake signal 314 to an external FIFO element 140 within the system interface (see FIG. 3). In an exemplary embodiment, the logic block 308 indirectly forwards the receive FIFO handshake signal 314 such that the FIFO handshake signal 314 functionally flows through the receive control element 130 (see FIG. 3) to the external FIFO. The receive control element 130 preferably monitors the handshake signals as they are going through. After a FIFO handshake signal is sent, logic block 308 outputs the 64 bit-wide data 320 to the external FIFO. In addition, in the described exemplary embodiment, a cyclic redundancy check element 310 performs a cyclic redundancy check on the current output data and a comparator 312 compares the current redundancy check with previous cyclic redundancy check data. The statistics generated by the logic block and the result of the CRC compare may then be output 322 for use by other elements outside the MAC.

In the described exemplary embodiment, the remaining operations in the receive pipeline may also use the rising edge of the clock signal 314 on an internal 64 bit pipeline bus. This eliminates the requirement for rising edge and falling edge processing solutions that are difficult to realize due to asymmetries in most clock signals.

Figure 5:
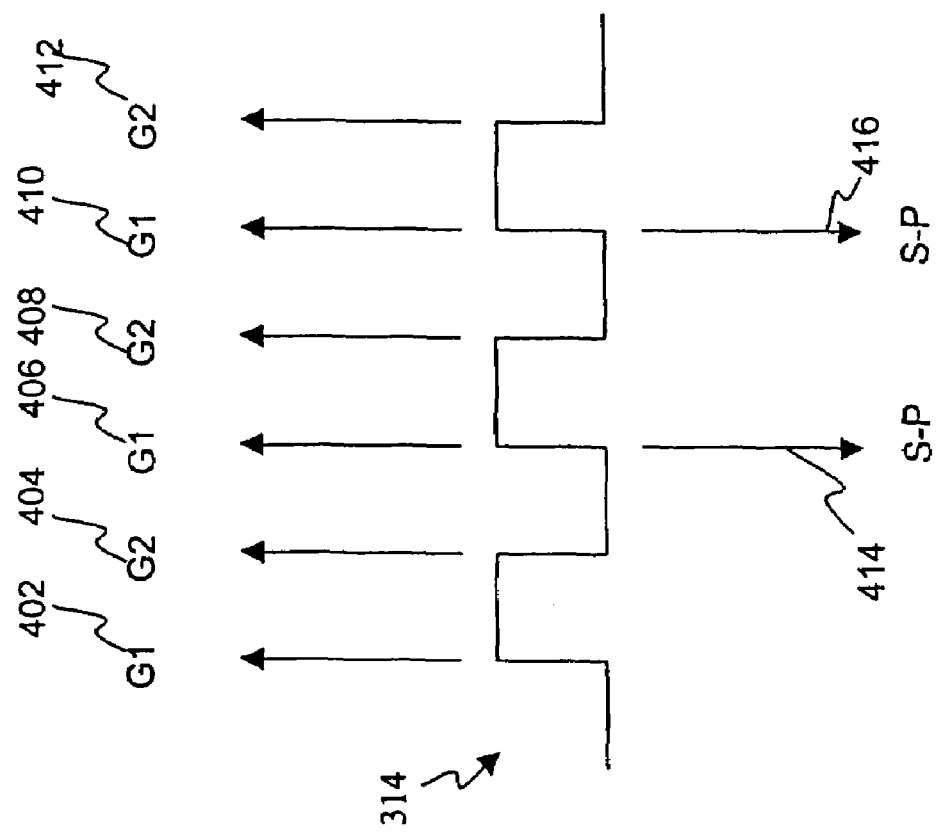
FIG. 5 is a wave diagram of the clock signal that graphically illustrates data sampling in accordance with an exemplary embodiment of the present invention.

FIG. 5 is a wave diagram of an exemplary clock signal 314. It can be seen that the clock signal 314, includes falling and rising edges. In accordance with an exemplary embodiment, a first gate element, designated G1, samples consecutive ones of instances of data having a first width at consecutive rising edges (402, 406, 410, etc.) of the clock. Further, a second gate element, designated G2, samples consecutive ones of instances of data having the first width at consecutive falling edges (404, 408, 412, etc.) of the clock. Data having the second, greater width is then processed at the second rising edges 414, 416 of the clock 314.

Figure 6:
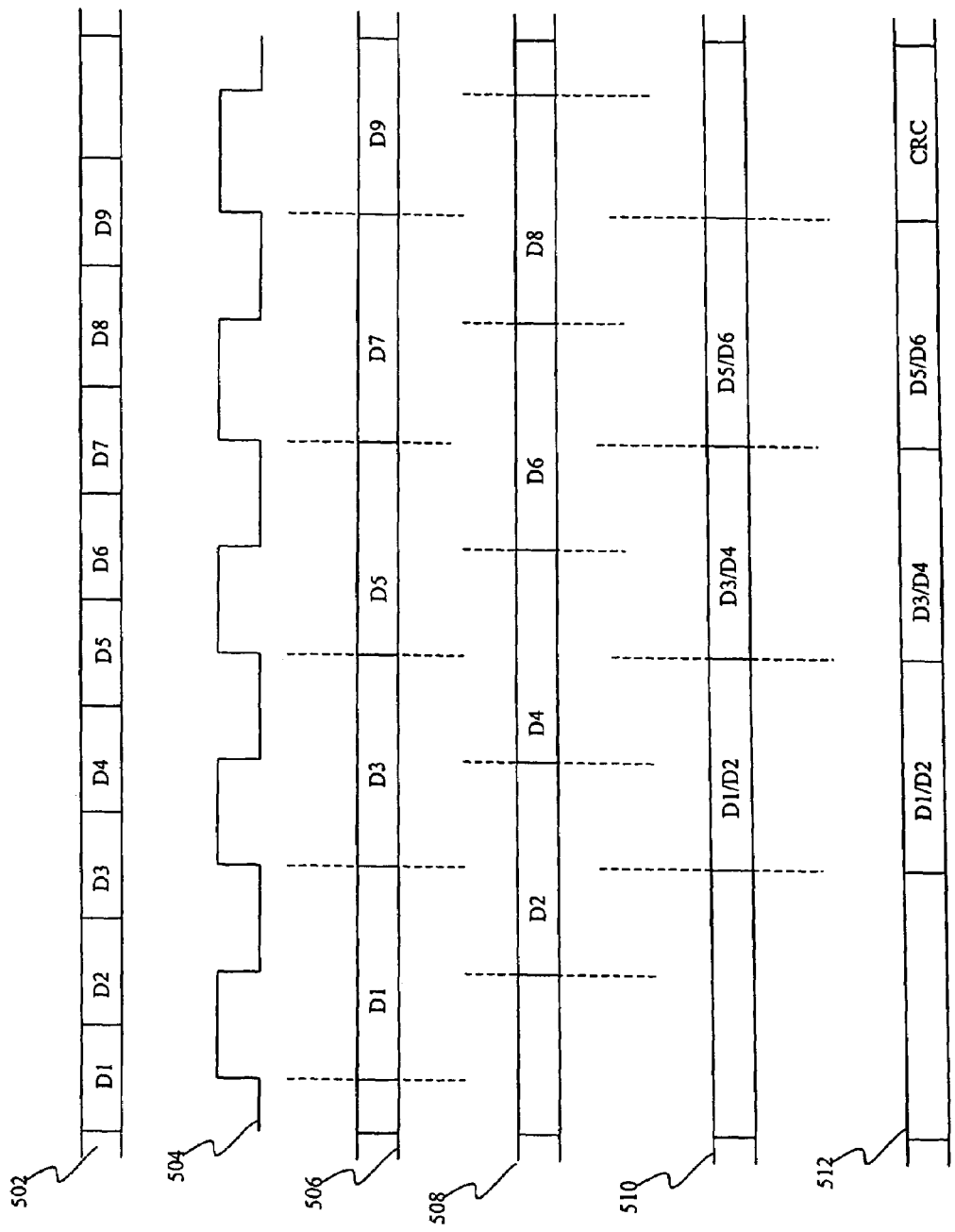
FIG. 6 graphically illustrates the timing of receive function of FIG. 4 in accordance with an exemplary embodiment of the present invention.

FIG. 6 graphically illustrates the timing of an exemplary asymmetric data path. In accordance with an exemplary embodiment of the present invention, input data 502 is represented by data bits D1, D2, D3, etc. and includes 32 data bits in a preferred embodiment. The wave/timing diagram in FIG. 6 shows the timing perspective of how 32 bit-wide input data 502 is converted to 64 bit-wide output data 512. In accordance with an exemplary embodiment of the present invention a first gate element 302 samples the input data 316 (502) on the "rising" edge of the clock signal 314 (506) In addition, a second gate element 304 samples the input data 316 (502) on the "falling" edge of the clock signal 314 (508) (BOA). In the described exemplary embodiment, the master gate 306 (510) converts the two 32 bit-wide data streams 506 and 508 to a 64 bit wide parallel data stream using a subsequent rising edge of the clock signal 504. In addition, the 64 bit-wide output data with CRC appended is also illustrated.

Figure 7:
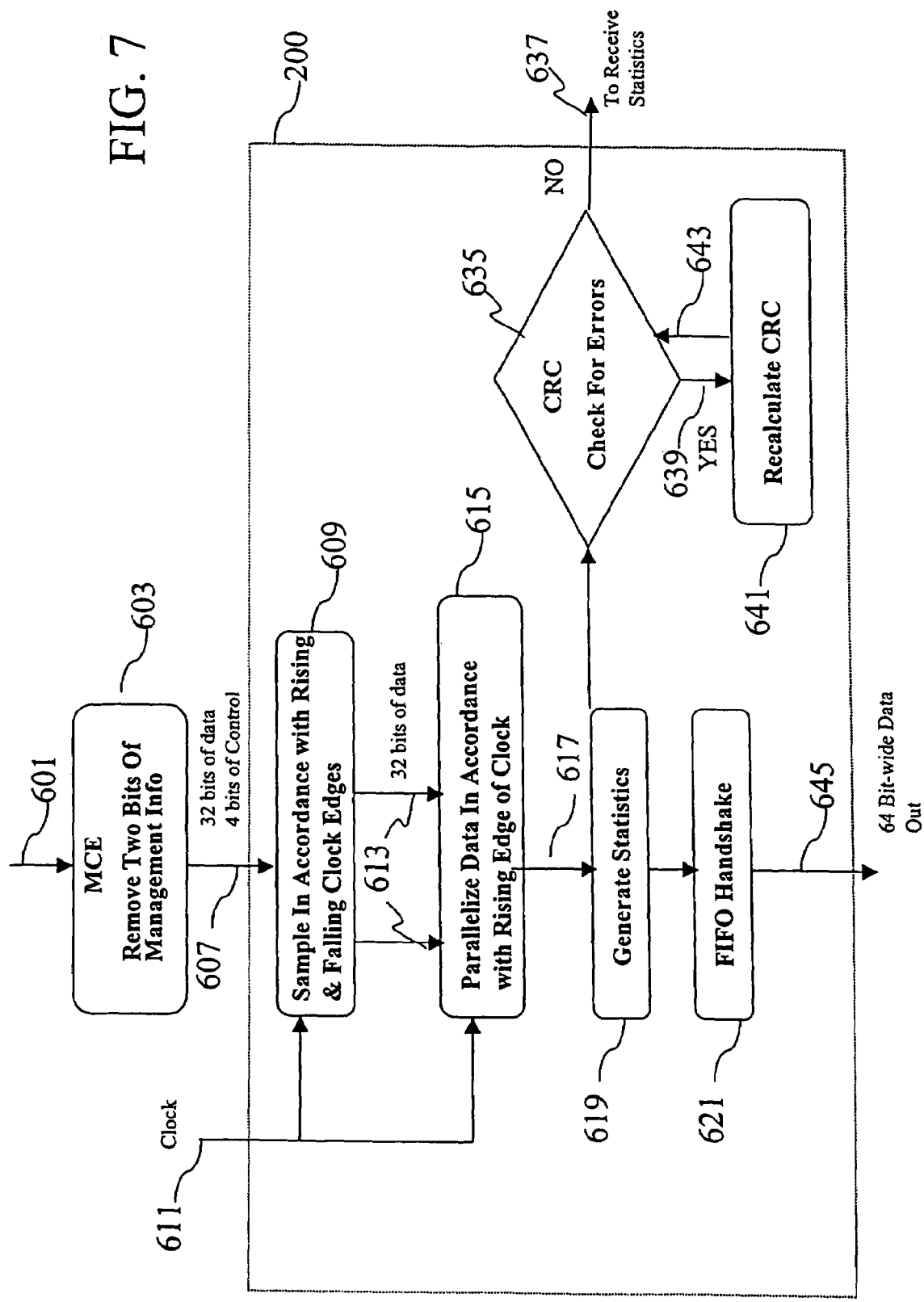
FIG. 7 is a flow chart showing a method for processing the data in accordance with an exemplary embodiment of the present invention.

FIG. 7 is a flow diagram illustrating an exemplary method for manipulating data according to the present invention. Like elements in the flow diagram of FIG. 7 (MCE 101, master gate element 306, logic block 308, and receive function element 200, for example) represent like elements in the preceding figures.

In accordance with an exemplary embodiment, input data 601 includes 32 bits of data, 2 bits of management information and 4 control bits. In the described exemplary embodiment the MII interface forwards the input data to the management control element (MCE). The MCE preferably strips the two bits of management information from the input data 603 and forwards the input data 607, comprising the 32 data bits and 4 control bits to the receive function element 200.

Within the receive function element 200, the input data 607 is sampled in accordance with the rising and falling edges of a clock signal 609 to produce two data outputs 613, each being 32 bit-wide data. The two 32 bit wide serial data streams may then be parallelized in accordance with the rising edge of the clock 615 to produce 64 bit wide parallel data 617. The parallel data may then be processed to generate statistics 619. For example, in an exemplary embodiment, a logic block may inspect the inter-packet gap (IPG) intervals, perform preamble insertions, data alignment and statistics generation. Before the data is output to the system interface, a receive FIFO handshake signal from the receive function element 200 is sent to an external FIFO 621.

In accordance with an exemplary embodiment, the 64 bit-wide data is output 645, and a cyclic redundancy check (CRC) 635 is performed on the current output data. In accordance with an exemplary embodiment, the receive function element may check for error in the current CRC by comparing the CRC data for the current output to stored (old) CRC data. In operation if errors are found 639, the CRC element recalculates the data 641 and re-sends the new CRC data 643 for another comparison 635 with the old CRC data before outputting the CRC data 637 to receive statistics. In this manner, data output 645 having a 64 bit-wide data path, is output from receive function element 200.

It will be appreciated by those of ordinary skill in the art that the invention can be embodied in other specific forms without departing from the spirit or essential character hereof. For example, the present invention is not limited to asymmetric data paths wherein the transmit clock is of a sufficient speed to maintain the desired data throughput. Rather, the present invention may be utilized to increase the data throughput in both the transmit and receive data paths or in the transmit data path alone. The present description is therefore considered in all respects to be illustrative and not restrictive. The scope of the invention is indicated by the appended claims, and all changes that come within the meaning and range of equivalents thereof are intended to be embraced therein.

What is claimed is:

1. A media access controller, comprising:
   a first gate for sampling an input data stream having a first bit width in accordance with a first rising edge of a clock;
   a second gate for sampling said input data stream in accordance with a first falling edge of a clock;
   a third gate coupled to said first second gates for combining outputs of said first and second gates in accordance with a second rising edge of said clock to produce an output data stream having a second bit width greater than said first bit width; and
   a logic block coupled to the third gate for generating statistics.

2. The media access controller according to claim 1 further comprising a management control element for processing management control bits in the input data stream to retrieve status information from ISO layers below a MAC layer.

3. The media access controller according to claim 1 further comprising a receive control element coupled to said third gate for providing flow control functionality.

4. A media access controller, comprising:
   a first data path having a first bit-width;
   a second data path including a receive function element that receives input data at said first bit width and processes said input data to generate output data having a second bit width greater than said first bit width, wherein said receive function element comprises:
      a first gate for sampling said input in accordance with a first rising edge of a clock;
      a second gate for sampling said input in accordance with a first fallg edge of a clock; and
      a third gate coupled to said first and second gates for combing outputs of said first and second gates in accordance with a second rising edge of said clock to produce said output data having said second bit width greater than said first bit width; and
   a logic block coupled to the third gate for generating statistics.

5. The media access controller according to claim 4 further comprising a management control element for processing management control bits in the input data to retrieve status information from ISO layers below a MAC layer.

6. The media access controller according to claim 4 further comprising a receive control element coupled to said third gate for providing flow control functionality.

7. A media access controller, comprising:

a first data path having a first bit-width;

a second data path including a receive function element that receives input data at said first bit width and processes said input data to generate output data having a second bit width greater than said first bit width, wherein said receive function element comprises:

a first gate for sampling said input in accordance with a first rising edge of a clock;

a second gate for sampling said input in accordance with a first falling edge of a clock; and a third gate coupled to said first and second gates for combining outputs of said first and second gates in accordance with a second rising egde of said clock to produce said output data having said second bit width greater than said first bit width; and a receive control element coupled to said third gate for providing flow control functionality, wherein the receive control element comprises a logic block coupled to the third gate for generating statistics.

\* \* \* \* \*